United States Patent [19]

Bénéjean

[11] 4,151,587
[45] Apr. 24, 1979

[54] REGULATOR SYSTEM INCLUDING A MODEL

[75] Inventor: Richard Bénéjean, Versailles, France

[73] Assignee: Alsthom-Atlantique, Paris, France

[21] Appl. No.: 854,964

[22] Filed: Nov. 25, 1977

[30] Foreign Application Priority Data

Nov. 25, 1976 [FR] France ................... 76 35511

[51] Int. Cl.² ............... G05B 13/02; G05B 17/02
[52] U.S. Cl. ............................. 364/106; 318/561; 364/114; 364/118
[58] Field of Search .......... 364/105, 106, 114, 116, 364/118, 496, 500; 318/561, 609, 610

[56] References Cited

U.S. PATENT DOCUMENTS

| 3,221,230 | 11/1965 | Osburn | 364/106 X |
| 3,225,179 | 12/1965 | Chestnut et al. | 318/561 X |
| 3,601,588 | 8/1971 | Bristol | 364/106 |
| 3,767,900 | 10/1973 | Chao et al. | 364/106 |
| 3,795,799 | 3/1974 | Courtiol | 364/106 |
| 4,054,780 | 10/1977 | Bartley et al. | 364/106 |

*Primary Examiner*—Joseph F. Ruggiero
*Attorney, Agent, or Firm*—Sughrue, Rothwell, Mion, Zinn and Macpeak

[57] ABSTRACT

The present invention relates to a regulator system including a model of the regulated process. This model is blocked when saturation occurs of a regulator controlled actuator in the regulated process, and the output signal of the model is then slaved to the feed-back measurement signal so as to allow the model to function again properly as soon as the saturation ends. The system applies to the regulating of industrial processes, in particular thermal processes.

6 Claims, 1 Drawing Figure

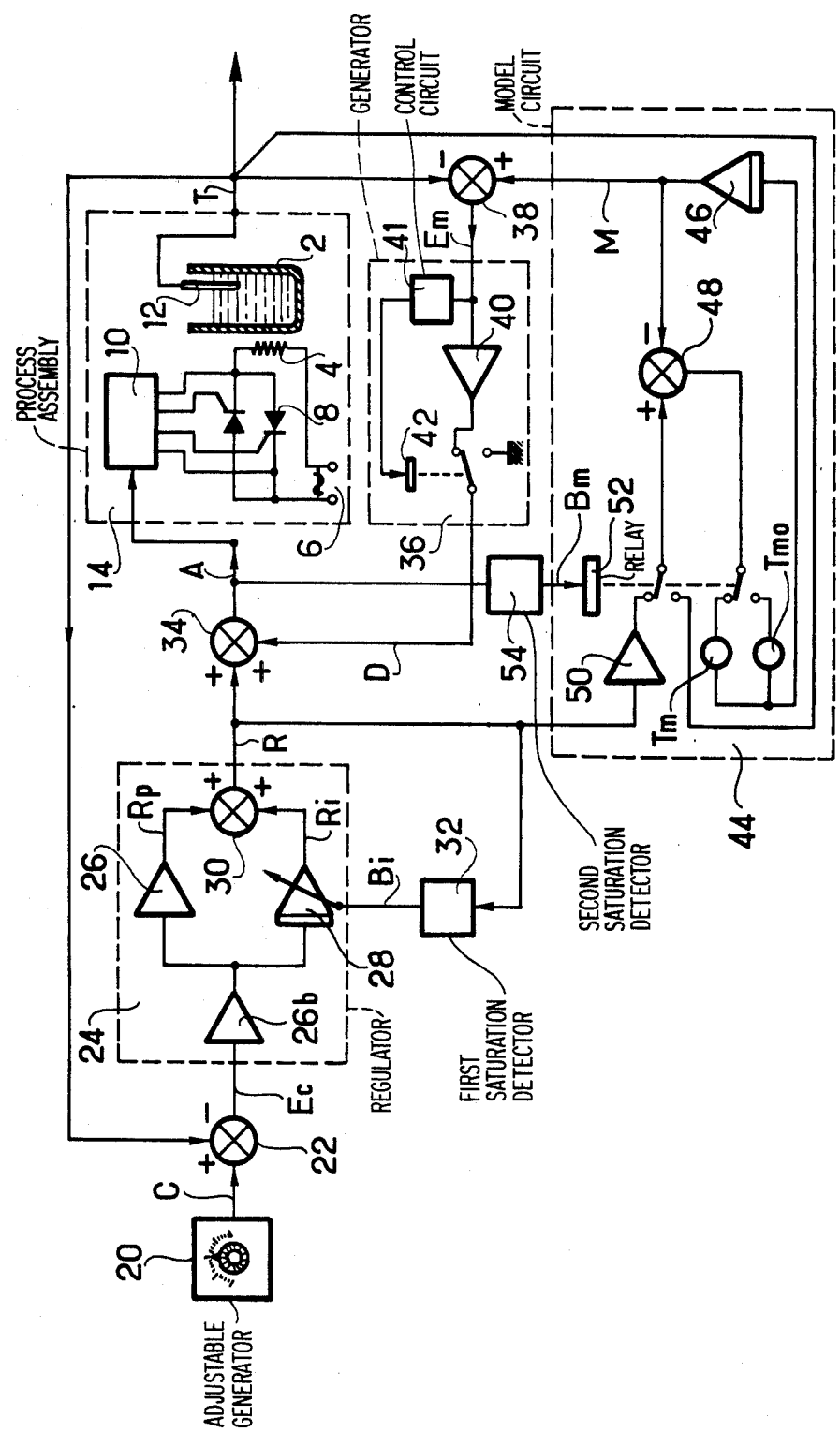

REGULATOR SYSTEM INCLUDING A MODEL

FIELD OF THE INVENTION

The invention relates to a regulator system including a model. Such a system has the function of controlling an actuator so that the action of the actuator will correspond as closely as possible to variable needs represented by a "command" signal. The needs can, for example, be to obtain water at a variable or constant temperature in a tank, in the presence of an ambient temperature which can likewise be constant or variable. The command signal is then representative of the water temperature which is to be obtained and the actuator is constituted by electric resistors for heating the tank and by the electricity supply system of the resistors. It will however be understood that the effects obtained depend on other items such as the walls of the tank through which heat is lost slowly and naturally. The electricity supply system is controlled by an "action" signal. The same applies to any other type of actuator and the function of the regulator system is to supply the action signal.

To fulfill this function, the regulator system compares the command signal with a "measurement" signal which represents the result of the action of the actuator, for example the temperature actually reached by the water of the tank because of the heating action exerted by the electric resistors.

DESCRIPTION OF THE PRIOR ART

The regulator system can be constituted in a particularly simple manner, provided the actuator operates in conditions which do not vary widely, i.e. for example, provided the tank is always filled approximately to the same level and provided the command signal varies slowly, i.e. for example in conditions such that when the command temperature drops, it is sufficient to stop the heating for the temperature of the water to drop as fast as the command temperature, or when the command temperature rises, the power of the heating resistors is sufficient for the temperature of the water to rise as fast as the command temperature.

In this case, the regulator system can be constituted by a simple regulator, for example of the P.I. type which comprises two regulation channels in parallel; a proportional channel and an integral channel. These two channels receive a same command error signal which is representative of the difference between the measurement signal and the command signal. This difference signal is multiplied by a constant factor in the proportional channel and it is integrated with respect to time in the integral channel. The two signals are added and their sum constitutes a "regulation" signal which constitutes the output signal of the regulator and can also constitute the previously mentioned action signal.

It should however be observed that for other types of actuator, the regulator can be constituted either more simply, for example with a single proportional or integral channel or in a more complex manner, for example with a third "differential" channel in parallel with the proportional channel and the integral channel, the "differential regulation channel" signal being added to the two other regulation channel signals to constitute the output regulation signal. Other embodiments are also possible for the regulator. Generally, the channel which tends to make the action signal proportional to the command error signal is called the "proportional" or "P" regulation or action channel, the channel which tends to make the action signal proportional to a time integral of the error signal is called the "integral" or "I" channel and the channel which tends to make the action signal proportional to a time derivative of the command error signal is called the "differential" or "D" channel.

Among the possible embodiments, "all or nothing" regulators can be mentioned which operate either by controlling the actuator at full power or by cutting off the power, according to the sign of the command error signal. Floating adjustment regulators can also be mentioned, they have constant or multiple rate, and act on the actuator for as long as there remains a difference between the measurement signal and the command signal to ensure its complete elimination. The rate at which the action signal varies is kept proportional to the difference.

Then come P, I, PI and PID regulators whose performance increases with complexity. Technically speaking, it is not essential for the various P, I or D actions to be connected in parallel. It is possible, for example, to envisage series or series parallel connections.

The function of the various P, I or D actions will now be specified. As previously stated, a regulator is called a "proportional action" regulator when the corrective action is proportional to the measured error. The main property of this type of regulator, which simultaneously constitutes its inherent fault, is that correction is never complete. There is always a residual error, often called the permanent difference. The phenomenon will be understood when it is pointed out that corrective action is not possible unless there is some error.

The error can be eliminated by integral action (integral action on its own requires low gain; in order not to compromise the stability of the system, it is often associated with proportional action). This combination guarantees the stability of the system. As long as there remains a permanent error, the integral action makes the action signal vary at a rate proportional to the difference. The regulated magnitude, as measured by the measurement signal, is finally brought to its command value as defined by the command signal.

The combination of these two regulating actions still does not lead to satisfactory regulation, especially when long delays come into play. The addition of a differential action to the regulator often makes it possible to obtain a rapid and vigorous correction which does not compromise the stability of the system (this differential action is very rarely used on its own). This action tends to make the action signal proportional to the rate at which the command error signal varies. It will therefore give a powerful impulse when there is a rapid disturbance. In contrast, it will not act when the regulated magnitude is stabilized at a determined value. In this case the action signal returns to its equilibrium value. This is why it is not used on its own, but in combination with the other corrective actions.

All these known dispositions improve the efficiency with which the regulators tend to bring the measurement signal constantly closer to the command signal. But some difficulties remain:

When the command signal undergoes a large rapid variation, a regulator system constituted simply by one of the regulators of the types previously described has a disadvantage if this regulator system includes, as is usual, an integral channel. The power of the actuator is, in fact, then insufficient for the requirement expressed by the command signal to be immediately satisfied, i.e.

for the measurement signal to follow the variation of the command signal without delay. It is then said that the "process" cannot follow the variation of the command signal. The word "process" designates here the assembly formed by the actuator and means affected by the actuator. It is also said that there is "saturation" of the actuator, which means that an increase of the action signal no longer has an increased effect on the actuator.

The result of this is that the error signal then has a high value of constant sign during a fairly long period. The integral regulation channel signal then becomes very large. The disadvantage of this situation appears when the measurement signal is again equal to the command signal. The high value reached then by the integral regulation channel signal then causes the regulation signal to stay at a high value for a fairly long time, which keeps the actuator uselessly in action and causes the measurement signal to overshoot the command signal.

Take, for example, the case where the actuator includes heating resistors and has to provide the initial heating of a tank of water from 0° to 80° when, the command signal passes suddenly from 0 to 80. The action signal then assumes a high value, which is higher than the saturation value and which ensures the maximum heating power. The water is then heated for example for 10 minutes. When it reaches a temperature close to 80° C., the integral regulation channel signal has become very large and maintains the action signal at a high value. The resistors therefore continue to heat the water at maximum power. The temperature of the water reaches 80° C.; the error signal changes sign and the integral regulation channel begins to decrease. The temperature of the water continues to rise until the integral regulation channel signal becomes sufficiently small. It can for example reach 100° C. Such overshooting of the command is expensive and sometimes it is a hindrance or destructive. This is why it has been proposed to complete the regulator system with "desaturation" means suitable for preventing the integral regulation channel signal from assuming too high a value when the measurement signal differs greatly from the command signal because of a sudden variation in the command signal or in the external conditions.

Known devices, even when they use the "desaturation" principle which has just been described, have another disadvantage when the actuator has to operate under very variable conditions. Such is the case, for example, in heating a tank of water which is full at one moment and almost empty at another. It is then said that the "parameters" of the process are variable. Now, the parameters of the regulator, such as the gain of the proportional channel and the time constant of the integral channel, are adapted to particular values of the parameters of the process. The regulator system therefore operates incorrectly when the parameters of the process differ widely from these particular values. If, for example, the regulator has been adapted to the heating of a full tank, it will provide, in the case of an almost empty tank, an action signal which will vary too much when there are small variations of the command signal. The result of this is that the command will be overshot and there will be detrimental temperature oscillations. That is why it is known to use a "model" circuit, which can be called simply the "model" and which simulates the process. This circuit receives the regulation signal and it is constituted so as to supply a "model" signal which varies substantially in the same way as the measurement signal would vary if the actuator were controlled directly by the regulation signal and if the actuator were operating in predetermined conditions corresponding to the adjustment of the model. The regulator is adapted to these same predetermined conditions. The difference between the measurement signal and the model signal is used to form an "adaptation" signal which is added to the regulation signal to supply the action signal.

If for example the model and the regulator correspond to the case where the temperature of a full tank is to be regulated, and if, in fact, the tank is half empty when it is required to raise its temperature from 50° C. to 52° C., the model signal will tend to be smaller than the measurement signal. For example, after one minute, the measurement signal could have a value of 52 (if the regulation signal is used as the action signal) while the model signal would only have a value of 51. In fact, if use is made of the adaptation signal the measurement signal is only a little greater than 51. The difference between the measurement signal and the model signal is used to form the adaptation signal, which is negative in this particular case and which decreases the value of the action signal. The result of this is that when there is an unchanged regulation signal, the use of the adaptation signal will cause the measurement signal to vary as if the tank were full. The regulation of the parameters of the regulator will therefore be correct and detrimental temperature oscillations in the tank will be avoided.

In practice, it has unfortunately appeared that when the command signal varies greatly and suddenly, regulator systems with models either cause losses of time or overshoots of the command values.

The aim of the present invention is to produce a regulator system including a model with which it is possible to avoid both delays and overshooting of the command subsequent to a rapid variation in the command signal.

SUMMARY OF THE INVENTION

The present invention provides a regulator system for regulating a process by means of an actuator and in response to a command signal defining a desired state of the process and a measurement signal indicative of the actual state of the process, the system comprising:

a command error detector connected to receive the command signal and the measurement signal and to supply a command error signal representative of their difference;

a regulator responsive to the command error signal to produce a regulation signal suitable for controlling the actuator;

a model circuit connected to receive the regulation signal and arranged to model the behaviour of the process, i.e. to provide a model signal which varies substantially in the same way as the measurement signal would vary if the process were operating under predetermined conditions and the actuator were controlled by the regulating signal;

a model error detector arranged to receive the model signal and the measurement signal and to supply a model error signal representative of their difference;

an adaptation signal generator connected to receive the model error signal and to derive an adaptation signal therefrom;

an adder connected to sum the regulation signal and the adaptation signal to derive an action signal which is, in fact, used for controlling the actuator; and saturation detection means arranged to provide an adaptation blocking signal when the actuator is saturated, or is at least in danger of being saturated, said blocking signal being arranged to cause the regulation signal to be applied directly as to action signal without the addition of the adaptation signal thereto; the model being responsive to the adaptation blocking signal and so arranged that the model signal is equal to the measurement signal when the adaptation blocking signal ceases to be supplied.

BRIEF DESCRIPTION OF THE DRAWING

An embodiment of the invention without limiting character will be described hereinbelow with reference to the accompanying schematic FIGURE.

This FIGURE shows a block diagram of a system in accordance with the invention.

DETAILED DESCRIPTION

Firstly the disadvantages of known regulator systems including a model will be explained in greater detail. They are observed when a great variation of the command signal occurs and causes saturation of the actuator while the effective operating conditions of the actuator are very different from those to which the model corresponds. In this case, the model signal quickly becomes very different from the measurement signal. When the measurement signal again reaches the command signal, the adaptation signal has become very large and causes a large and lasting disturbance in the operation of the regulator system.

Let us suppose firstly that the model corresponds to the heating of a full tank and that it is required to perform the initial heating of the tank when half empty. There will be no saturation of the actuator, but the presence of the model will approximately double the heating time. To avoid loss of time, if this situation occurs frequently, circumstances will lead to the choice of a model corresponding to the half empty tank and to the adjustment of the regulator correspondingly. Let us suppose that it is then required to perform the initial heating of the tank when full. The actuator will then be saturated, i.e. the maximum heating power will be used, this being normal to avoid loss of time. The temperature of the tank and the measurement signal will increase slowly. But the signal of the model will increase approximately twice as fast. The adaptation signal will therefore tend to further increase the action signal and this will have no consequence, since the maximum heating power will already be in use. But there will come a moment when the tank will reach the command temperature i.e. the measurement signal will again be equal to the command signal. At that moment and even before that moment if the delays in the transmission of heat are taken into accout, it will be necessary to reduce the heating power. The regulator can allow such a reduction. Unfortunately, the model signal, which has become very large (and corresponds for example to 100° C. if the water has been heated from 0° to 50° C.), will then generate an adaptation signal which, on being added to the decreased regulation signal, will keep the action signal at a high value. The result of this is that the heating will continue for a time at the maximum available power and that the temperature of the tank will considerably overshoot the command temperature. Such an overshoot can be particularly dangerous when operating in the vicinity of the boiling temperature of water. This is why the invention provides adaptation blocking means which prevent the adaptation signal from being taken into account when the action signal leaves a predetermined interval.

The regulator system which will be described by way of an example is used for regulating the heating of a water tank 2 by means of a register 4 fed from the mains via thyristors 8 controlled by a circuit 10, which is itself controlled by an "action" signal A. The temperature of the water is measured by means of a thermometer 12 constituted for example by an iron-constantan thermocouple which supplies a "measurement" signal T. The tank can have a capacity of 10 l and the resistor 4 can be capable of supplying a heating power of 1kW which is used for heating the water. The water of this tank is cooled naturally because of the heat losses when no current passes through the resistor 4, the power of these losses being for example 100 W when the water is at 80° C.

The assembly 14 of elements which have just been described constitutes what is often called the "process", the actuator being constituted by the resistor 4 and its supply system 6, 8, 10. More generally, the process receives an action signal such as A and provides a measurement signal such as T. The function of the regulation system is to provide an action signal such that the measurement signal remains constantly as close as possible to a command signal C supplied by an adjustable generator 20.

The regulator system described uses various signals which, to understand the figures, must be considered as being electric potentials but which can in practice assume very diverse forms, the most usual forms being those of an electric potential or of an electric current. However, to understand the invention, the only important thing, is to know the magnitudes which are represented by these signals. In the example described hereinbelow, these magnitudes are temperatures and heating powers. That is why a signal always representing a temperature or always representing a power will be expressed hereinbelow in degrees centigrade or in watts. However, it remains evident that a signal representing, for example, a difference of temperatures of 10° C. and therefore indicated hereinbelow as "equivalent" to 10° C. can assume the practical form of a current of 7 mA or of a difference in potential of $-3V$, for example, according to the technology chosen by the manufacturer of the regulator system. Such technologies are well known.

The regulator system comprises firstly an adder 22 which receives the command signal C on a positive input and the measurement signal T on a negative input. This adder supplies a command error signal $Ec = C - T$ which constitutes the input signal to a regulator 24 which comprises a proportional channel and an integral channel in parallel. The proportional channel is constituted by a unity gain amplifier 26 and a positive constant gain Kr amplifier 26b which receives the command error signal Ec and which supplies a proportional regulation channel signal $Rp = Kr.Ec$. The gain Kr can, for example, be $Kr = 10W/°C$. This gain can be expressed in watts per degree centigrade since the regulation channel signals are used to control a heating power expressed in watts, whereas the command error signal measures a difference in temperature. The integral channel is constituted by an integrator 28 which can have an active state in which it receives the command error signal Ec and supplies an integral regulation channel signal Ri varying according to the integral $Ri = Kr/Tr \int Ec.dt$, Kr being the gain of the amplifier 26b, Tr being a constant equivalent to a time and being for example 100s whose inverse $1/Tr$ will be called here the regulation "integration gain" and t being time.

The integrator 28 can be blocked i.e. the application of an integration blocking signal Bi puts the integrator in a "blocked" state in which the output signal Ri of the integrator is constant whatever the value of the command error signal may be. The value of the integrator output signal during the blocked state is that which the output signal had just before the blocking signal was applied. When the blocking signal ceases to be applied, the integral regulation channel signal begins to vary again, as previously set forth, starting from the value which it had during the block period.

The two regulation channel signals are received by an adder 30 which delivers a regulation signal R which is equal to the sum of the two regulation channel signals and which constitutes the output signal of the regulator 24.

$$R = Rp + Ri = Kr.(Ec = 1/Tr \int Ec.dt)$$

The regulation signal R is used for forming the action signal A. The result of this is that there is a risk of saturation of the actuator when the regulation signal leaves a predetermined interval. This is why a first saturation detector 32 uses the regulation signal R to generate the integration blocking signal Bi previously mentioned.

This signal is delivered for example when the regulation signal R moves outside the range lying between 0 and 1 Kw. It can be specified here why the integration blocking signal is generated from the regulation signal rather than from the action signal:

It is in order to ensure an autonomous operation of the regulator 24 with respect to the remainder of the regulator system. Indeed, if the action signal which is generated from the regulation signal and from the adaptation signal was adopted as the blocking signal, as will be explained hereinbelow, the situation could be such that the action signal will not be saturated and in contrast, that the regulation signal will be saturated (for example with the regulation signal equal to 1 Kw, the adaptation signal equal to $-200W$, the action signal then being 800 W, hence not saturated). In this case, the integral channel would operate in a permanent saturation zone unfavourable to proper operation.

The regulation signal reaches an adder 34 which also receives an adaptation signal D, sums these two signals and supplies the action signal A to the process 14.

$$A = R + D$$

The adaptation signal D is supplied by an adaptation signal generator 36 from a model difference signal Em which is itself supplied by an adder 38 which gives the difference between the measurement signal T received on a negative input and a model signal M received on a positive input:

$$Em = M - T$$

This generator 36 can be constituted simply by an amplifier 40 of suitably chosen constant gain, for example 10W/° C. It is, however, often advantageous to avoid the disadvantages of a possible drift of this amplifier when the model error signal Em is close to zero. That is why in the latter case a control circuit 41 with symmetrical thresholds actuates a relay 42 which maintains the adaptation signal at the value zero as long as the signal Em remains sufficiently close to zero, for example when it lies between + and $-1°$ C.

The signal M is supplied by a model circuit 44 (also called the "reference model") whose function is to simulate a process state, i.e. the function of this circuit is to receive the regulation signal R and to supply a model signal M which is such that provided the model is regulated to correspond to the real state of the process, (for example the tank 2 filled to 50%), the signal M varies substantially in the same way as the measurement signal would vary if the action signal A were constituted only by the regulation signal R.

This function is fulfilled when the model circuit 44 is in a state called an "active" state. For this purpose, it comprises an integrator 46 whose integration gain can assume two distinct values and whose output signal constitutes the model signal M. This integrator receives, via an adder 48, the regulation signal R amplified by an amplifier 50 with a gain of Km. The adder 48 also receives the output signal of the integrator on a negative input. The signal M then varies according to the first order differrential equation:

$$TmdM/dt = Km.R - M$$

where $1/Tm$ is the integration gain of the integrator 46 when the model is in its active state. It is because this equation comprises a first derivative of M that the model is said to be of the first order. The result of this equation is that M varies substantially as the measurement signal T provided that: the tank 12 is filled to a certain level; the gain Km is suitably chosen to represent the inverse of the thermal conductance of the tank filled to this same level, i.e. so that the ratio M/Km represents the heat loss of the tank; Tm is chosen so that the ratio Tm/Km represents the thermal inertia of the tank, still filled to said level; and the regulation signal R expressed in watts represents the heating power effectively applied to the tank.

The thermal losses can then be expressed in W/° C. and the thermal inertia can be expressed in W.s/° C. (time necessary for a predetermined heating power such as 1 W, for example, to raise the temperature of the tank by 1° C.). For example it is possible to choose Km=1° C./W and Tm=2000 s so that the model will correspond to a half empty tank.

It is quite evident that other units could be chosen.

The model circuit 44 also includes switching means constituted by a relay 52 controlled by an adaptation blocking signal Bm which is supplied by a second saturation detector 54 when the action signal A moves outside a predetermined range. Saturation of the process is outside this range i.e. the heating power is zero or greater than 1 kW.

When this blocking signal is supplied, the model circuit 44 passes to a state called the "slave" state, i.e. the positive input of the adder 48 does not receive the regulation signal but receives the measurement signal T instead. As for the negative input, it still receives the model signal M supplied by the integrator 46. But the integration gain of the latter has then assumed, under the action of the relay 52, a value $1/Tmo$ which is much greater than $1/Tm$. The signal M then varies according to the differential equation.

$$TmodM/dt = T - M$$

which shows that the signal M varies so as to come constantly closer to T, with the time constant Tmo. This time constant is chosen sufficiently small, for example 1s, for the adaptation signal to be cancelled rapidly in the presence of saturation.

This disposition makes it possible to use the same integrator 46 to ensure the proper operation of the model circuit in its active state and in its slave state. This double use makes it possible to ensure in a particularly simple manner:

(1) At the beginning of the blocking signal, that the signal M reaches the signal T rapidly;

(2) During the blocking signal, that the signal M remains substantially equal to the signal T despite variations of the latter;

(3) At the end of the blocking signal, that the signal M again begins to vary according to the values of the signal R starting from the value which it had acquired at the end of the blocking signal.

To illustrate the advantages of the invention, a numerical comparison with a conventional proportional integral regulator without any anti-saturation device will be given hereinbelow, the proportional channel and integral channel being adjusted for a minimum level tank, about an operation point of 50° C.

For a rise in temperature from 20° C. to 50° C., the tank being at its minimum level, the overshoot is 7.1%. The time during which overshoot remains (return to the command value) is 228 s.

In the same test conditions but with a full tank, the overshoot is 7.2% and the duration of overshoot is 780 s.

If the invention is used in the same test conditions, there is no overshoot when the P. I regulator is adjusted as for the test without the invention and when the model likewise represents the process corresponding to a tank at the minimum level. The rise times are substantially unchanged.

The model described hereinabove was a first order model. It is indeed relatively rare to use a second order model. Tests have, for example, been made successfully for regulating the temperature of an industrial furnace for the doping of semiconductors leading in principle to a second order model. But since the furnace used was very isolated, the losses towards the outside medium were very low. The equation illustrating the heat loss could then be expressed approximately in the form:

$$C.m.dT/dt = R$$

where C is the equivalent specific heat of the furnace and m is its total equivalent mass. The process is then no longer of the first order properly speaking but can be represented by a pure integrator functioning according to the above equation. That is why excellent performance has been obtained while keeping to a model of the first order.

Tests have even been made of this same furnace with the use of a P. I. D. regulator. With the differential action bringing all its advantages, the results obtained were that much better.

Of course, other embodiments of the invention are still possible. It is, for example, possible to use a differential action not in parallel with the proportional and integral action, but in series, by adding to the command error signal Ec, before its application to the amplifier 26b, a signal proportional to the derivative of the measurement signal T.

The following articles can be cited to illustrate prior art.

"Les systèmes adaptatifs avec modèle (théorie, mise en oeuvre, applications)" Automatisme vol. 15 No 5, pp. 272-292—May, 1971. LANDAU I. D.

"An approach to Model Referenced Adaptative Control Systems" IEEE Trans. on Automatic Control, vol. AC-12, No 1 pp. 74-80, February, 1967.

"The characteristics of model following systems as synthesised by optimal control" - IEEE Trans. on Automatic Control, AC 11, pp. 84-92—1966. J. S. TYLER Jr and F. TUTEUR.

"Asservissements linéaires continus" DUNOD - Paris 1971. F. de CARFORT and C. FOULARD.

What is claimed is:

1. A regulator system for regulating a process by means of an actuator and in response to a command signal defining a desired state of the process and a measurement signal indicative of the actual state of the process, the system comprising:

a command error detector connected to receive the command signal and the measurement signal and to supply a command error signal representative of their difference;

a regulator responsive to the command error signal to produce a regulation signal suitable for controlling the actuator;

a model circuit connected to receive the regulation signal and arranged to model the behaviour of the process, i.e. to provide a model signal which varies substantially in the same way as the measurement signal would vary if the process were operating under predetermined conditions and the actuator were controlled by the regulation signal;

a model error detector arranged to receive the model signal and the measurement signal and to supply a model error signal representative of their difference;

an adaptation signal generator connected to receive the model error signal and to derive an adaptation signal therefrom;

an adder connected to sum the regulation signal and the adaptation signal to derive an action signal which is, in fact, used for controlling the actuator; and saturation detection means arranged to provide an adaptation blocking signal when the actuator is saturated, or is at least in danger of being saturated, said blocking signal being arranged to cause the regulation signal to be applied directly as the action signal without the addition of the adaptation signal thereto; the model circuit being responsive to the adaptation blocking signal and so arranged that the model signal is equal to the measurement signal when the adaptation blocking signal ceases to be supplied.

2. A system according to claim 1 wherein the model circuit is connected to receive the measurement signal in addition to the regulation signal and includes switching means responsive to the adaptation blocking signal to cause the model circuit to switch between an active state in the absence of the adaptation blocking signal, and a slave state in the presence of the said blocking signal, in which slave state the model signal is made constantly equal to the measurement signal whereby the model error signal and hence the adaptation signal are maintained at a zero value and whereby the model signal is arranged to be equal to the measurement signal when the adaptation blocking signal ceases to be supplied.

3. A system according to claim 2, in which said model circuit is a first order circuit, and comprises:
an adder provided with a positive input and a negative input and supplying an output signal equal to the difference of the signals applied to these two inputs;
an integrator which can have two values of integration grain, the integrator receiving and integrating the output signal of the adder and supplying the model signal as the model circuit output signal and also to the negative input of the adder; and
an amplifier which receives the regulation signal and supplies an amplified regulation signal;
said switching means being connected to apply the amplified regulation signal to the positive input of the adder and to impart the smaller of the integration gain values to the integrator when the model circuit is in its active state, and to apply the measurement signal to the positive input of the adder and to impart the greater of the two integration gain values to the integrator when the model circuit is in its slave state.

4. A system according to claim 1, wherein the saturation detection means is connected to receive the action signal and to supply said adaptation blocking signal when the action signal leaves a predetermined range.

5. A system according to any claim 1, in which said regulator includes an integral regulation channel and further includes integration blocking means to prevent the integral regulation channel signal from varying while the actuator is in danger of being saturated.

6. A system according to claim 5, wherein the saturation detection means of the integral regulation channel comprises a first saturation detector connected to receive the regulation signal and to supply an integration blocking signal to the integral regulation channel when the regulation signal leaves a predetermined range, and the saturation detection means which supplies the adaptation blocking signal comprises a second saturation detector which receives the action signal and supplies said adaptation blocking signal when the action signal leaves a predetermined range.

* * * * *